United States Patent [19]

Baudermann

[11] Patent Number: 5,061,129
[45] Date of Patent: Oct. 29, 1991

[54] CLAMPING ARRANGEMENT FOR A CUTTING TOOL

[75] Inventor: Adolf Baudermann, Nürtingen, Fed. Rep. of Germany

[73] Assignee: The Cross Company, Fraser, Mich.

[21] Appl. No.: 561,384

[22] Filed: Aug. 1, 1990

[51] Int. Cl.$^5$ .......................... B23C 9/00; B23D 35/00
[52] U.S. Cl. .......................................... 409/234; 83/676
[58] Field of Search .................. 409/232, 234; 51/168; 83/676, 481, 666; 279/1 A, 1 W, 1 B

[56] References Cited

U.S. PATENT DOCUMENTS

| | | | |
|---|---|---|---|
| 3,440,915 | 4/1969 | Weyant | 83/676 |
| 3,656,393 | 4/1972 | Goellner | 51/168 X |
| 4,204,787 | 5/1980 | McCray et al. | 409/234 |
| 4,325,664 | 4/1982 | Mori | 409/234 |
| 4,339,893 | 7/1982 | Fournier | 409/234 X |

FOREIGN PATENT DOCUMENTS

| | | | |
|---|---|---|---|
| 68126 | 11/1948 | Denmark | 279/1 B |
| 241011 | 10/1986 | Japan | 409/234 |
| 956181 | 9/1982 | U.S.S.R. | 83/676 |

*Primary Examiner*—William Briggs
*Attorney, Agent, or Firm*—John R. Benefiel; Raymond J. Eifler

[57] ABSTRACT

A clamping arrangement is disclosed for an annular milling cutter comprises a receiving flange which has a centering collar concentric with the axis of rotation. With the aid of clamping means the milling cutter is held on the receiving flange and positively connected to the latter by at least one engaging member. To enable the gripper of a tool changer to have unobstructed access, a pressure flange carrying a number of radially protruding teeth on its rim is provided, axially movable by an actuator rod selectively operated by an actuator. The milling cutter has in its central opening radially inwardly protruding teeth, the spacing of which corresponds to the spacing of the teeth on the pressure flange. By setting the position of the teeth offset relative to one another, the milling cutter can be moved over the pressure flange, and rotating the cutter to align the teeth, the pressure flange can clamp the milling cutter against an abutment surface on the receiving flange, acting through the aligned teeth.

16 Claims, 2 Drawing Sheets

CLAMPING ARRANGEMENT FOR A CUTTING TOOL

The invention is based on a clamping arrangement for a disc-shaped cutting tool such as annular milling cutters.

The driving torques which occur when workpieces are machined with small milling cutters lie in a range which can be readily transmitted with steep taper receiving shafts. Therefore, small milling cutters can be mounted on steep taper receiving shafts in machining centers with automatic tool changers, with the usual measures being taken for fixing the receiving shafts in the machine spindle.

In the case of face milling cutters with a large diameter from approximately 300 mm onwards or, the cutting forces which occur during machining are so high that the corresponding driving torques can no longer be transmitted via steep tapers. In this case, the milling cutters have to be attached in a different way. To this end, it is known in practice to attach to the machine spindle a receiving flange comprising a cylindrical, protruding centering collar. The milling cutter with its disc-shaped main body is positioned with a corresponding through-opening on this centering collar which fixes the milling cutter radially. It is axially secured, on the one hand, by the flat, ring-shaped surface extending around the centering collar, and, on the other hand, by several clamping screws arranged on a circle. The clamping screws are screwed into threaded bores of the receiving flange and extend through key-hole-like elongate holes in the milling cutter.

With a clamping device of such design, to change the milling cutter, the clamping screws first have to be loosened in order that the milling cutter can turn on the receiving flange until the section of the elongate holes with the large diameter is in alignment with the heads of the clamping screws. The milling cutter can then be taken off the receiving flange.

A disadvantage of this type of clamping is that both the gripper for the tool and the screwdriver for the clamping screws are applied from the front side of the tool and, therefore, obstruct one another. This results in a complicated and involved solution.

With this as point of departure, the object underlying the invention is to create a clamping device for a disc-shaped tool wherein the gripper for the tool has unobstructed access to the tool.

SUMMARY OF THE INVENTION

The present invention comprises a clamping arrangement for annular cutting tools for releasably securing the cutting tool to a receiving flange secured to the spindle of a machine tool. The arrangement includes a clamping member including an actuator rod extending back through a central opening in the receiving flange and spindle, adapted to be moved axially by an actuator and a clamping flange portion affixed thereto. The clamping flange is rotatively coupled to the receiving flange but relatively movable axially. A central opening of the cutting tool is formed with a series of inwardly protruding features comprised of equidistant teeth corresponding to a series of outwardly protruding features comprised of equidistant teeth formed on the periphery of the pressure flange. The teeth of the cutting tool in a first rotative position of the tool can pass through by the teeth of the pressure flange and rotation to a second position allows clamping of the cutting tool by the teeth of the clamping flange acting on the aligned teeth of the cutting tool.

Use of the toothed pressure flange makes it possible to transfer the means for actuating the pressure flange to the rear side of the tool so the front side of the tool is completely free. At the same time, the teeth ensure that the tool is uniformly pressed against the receiving flange practically along its entire circumference.

If the teeth on the pressure flange are arranged opposite the abutment surface on the receiving flange, there is then no occurrence of twisting or distortion in the tool itself when it is clamped. Therefore, the flat configuration is in no way impaired and there is also no misalignment of the cutting position of the tool when the pressure flange is pulled towards the receiving flange.

Guidance of the pressure flange when the clamping device is in the released state is very simple and effective if the pressure flange carries a coaxial journal which is positioned and guided in the through-opening of the receiving flange. This sliding guidance is preferably sealed to prevent coolant and chips from penetrating the interior of the machine spindle.

To move the pressure flange, the actuating device is axially immovably connected to the journal. In this way, no play whatever can occur when the pressure flange is actuated.

With the novel clamping device, rotary motion corresponding to half of the center-to-center distance between two adjacent teeth is required to remove the tool from and position the tool on the machine spindle. The rotary angle required for this can be automatically delimited with the aid of the engaging member which is provided in any case by the receiving pocket on the tool cooperating with the engaging member having a dimension in the circumferential direction which together with the corresponding dimension of the engaging member define the rotary angle. During clamping and release, it is thus possible to introduce a rotary elastic pretension between the tool and the machine spindle which in any case ensures that in the one position, the teeth on the tool and on the pressure flange are in alignment with one another and in the other position, they fill the spaces between the opposite teeth exactly, thereby enabling proper insertion and separation.

In particular, if tool exchange by hand is necessary, this automatic location of the angle of rotation is advantageous because circumstances may prevent the fitter from being able to observe the position of the cooperating teeth.

The force for pressing the tool increases if there is an increase in the size of the teeth towards the base, while, on the other hand, the position of the teeth so as to fill the spaces enables mounting and removal of the tool with larger angular tolerance.

Manufacture of the teeth on the tool is particularly simple if the tooth gap has a semicircular shape in the projection onto the plane at right angles to the axis of rotation. The teeth on the pressure flange may be of trapezoidal shape in the same projection.

To prevent chips from penetrating into the region of the cooperating teeth, the opening on the tool may have at least one radially inwardly protruding shoulder which at least covers the teeth of the pressure flange towards the front.

DETAILED DESCRIPTION

Figure 1:
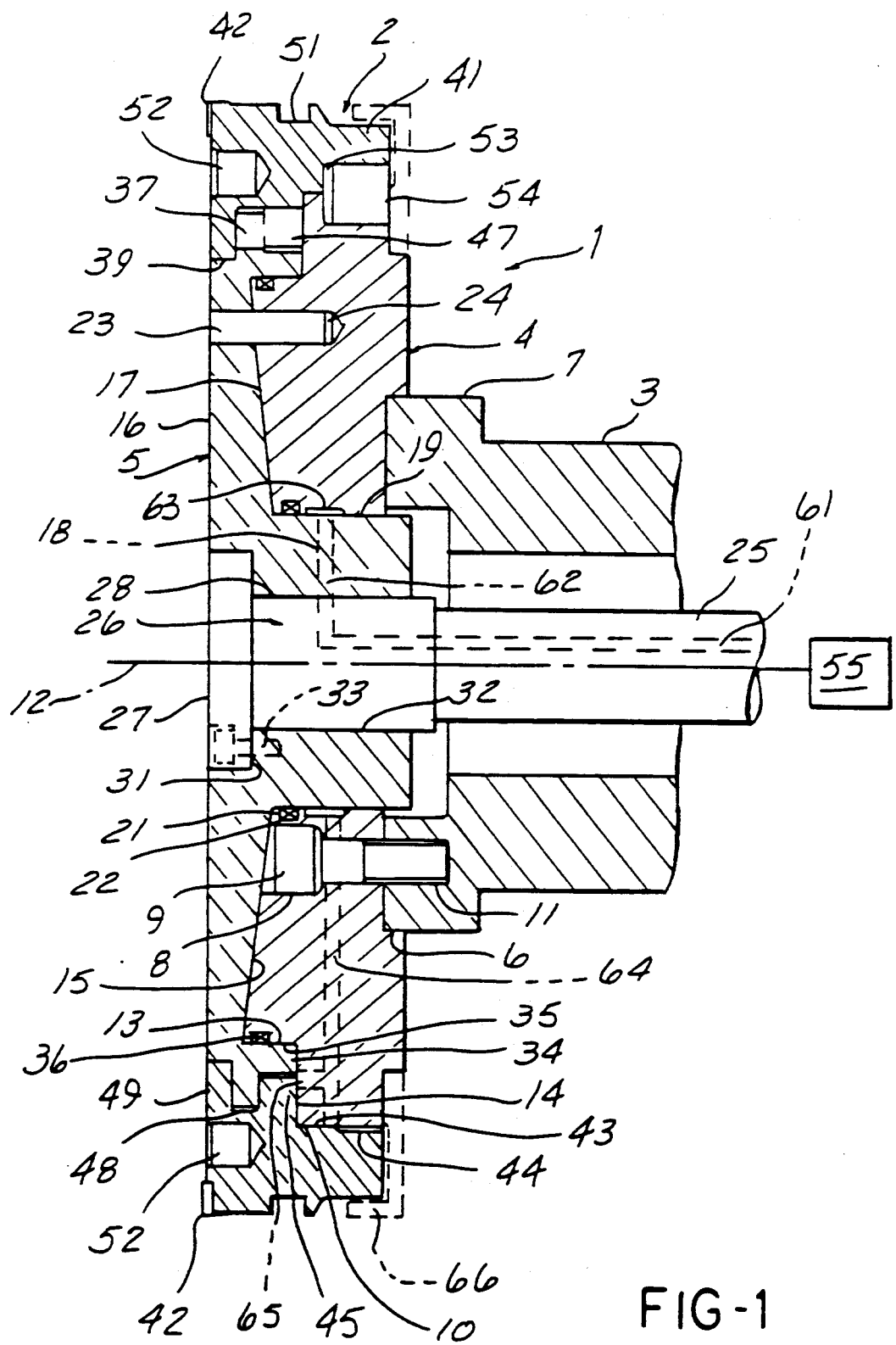
FIG. 1 is a longitudinal section of the clamping arrangement according to the invention.

FIG. 1 shows a clamping device 1 which serves to attach a face milling cutter 2 to a machine spindle 3 illustrated in shortened form. It comprises as main components an approximately disc-shaped receiving flange 4 and a likewise approximately disc shaped pressure flange 5 and surfaces and structures on the face milling cutter 2 which cooperate with the receiving flange 4 and with the pressure flange 5.

On its side facing the machine spindle 3, the receiving flange 4 comprises a coaxial, turned recess 6 of cylindrical shape by means of which it is positioned in a play-free manner on a likewise cylindrical spindle nose 7. The receiving flange 4 is firmly screwed by means of several headed screws 9 located in sunk bores 8 to the flat end face of the spindle nose 7 which comprises corresponding threaded bores for this purpose. The sunk, stepped bores 8 sit on a common graduated circle and are distributed equidistantly around an axis of rotation 12 of the machine spindle 3.

On its circumference, the receiving flange 4 comprises a cylindrical centering surface 10 concentric with the axis of rotation 12 for the milling cutter 2.

On its front side facing away from the spindle nose 7, the receiving flange 4 has a cylindrical collar surface 13 which is coaxial with the axis of rotation 12 and passes into a flat, ring-shaped abutment surface 14 which is likewise concentric with the axis of rotation 12 and cooperates with the centering surface 10 when the milling cutter 2 is being centered.

The surface leading inwardly from the collar surface 13 to the axis of rotation 12 is a conical surface 15, the tip of which faces the spindle nose 7.

The plate-shaped pressure flange 5 is flat on its front side 16 and has a conical surface 17 complementary with the conical surface 15 on its rear side facing the receiving flange 4, which provides reinforcement for the pressure flange 5. A cylindrical journal 18 is integrally formed on the conical surface 17 and is seated play-free in a longitudinally displaceable manner in a corresponding bore 19 extending through the receiving flange 4. The journal 18 is guided in a sealed manner in the bore 19 with the aid of a seal 21 inserted in an annular groove 22 of the receiving flange 4. The annular groove 22 is machined in the inside circumferential surface of the through-bore 19 in the proximity of the conical surface 15.

To prevent turning of the pressure flange 5 relative to the receiving flange 4, it comprises in the proximity of its outer edge at least one cylindrical pin 23 which is introduced with a slide or push fit into a bore 24 of the receiving flange 4 which is in alignment with it. The pin 23 extends parallel to the axis of rotation 12 and hence prevents relative rotative movement of the pressure flange 5 with respect to the receiving flange 4 while allowing limited axial movement therebetween.

The pressure flange 5 is actuated by an actuating rod 25 which is guided through the hollow machine spindle 3 to the pressure flange 5. The actuating rod 25 comprises a cylindrical head section 26 of larger diameter which passes at its foremost end into a flange 27. A shoulder 28 is created at the point of transition between the head section 26 and the flange 27. With this shoulder 28, the flange 27 rests on a corresponding coaxial annular shoulder 31 of the pressure flange 5 which has a corresponding stepped bore 32 for receiving the flange 27 as well as the head section 26.

The flange 27 is screwed to the pressure flange 5 via several cop screws 33 which extend through the flange 27 and are screwed into the pressure flange 5.

At the radially outwardly located edge, the pressure flange 5 carries a coaxial, cylindrical shoulder 34 of tubular configuration which points in the direction towards the receiving flange 4, is guided with its inside circumferential surface 35 and is likewise sealed by a seal 36 which is arranged in a corresponding groove in the collar surface 13.

Figure 2:
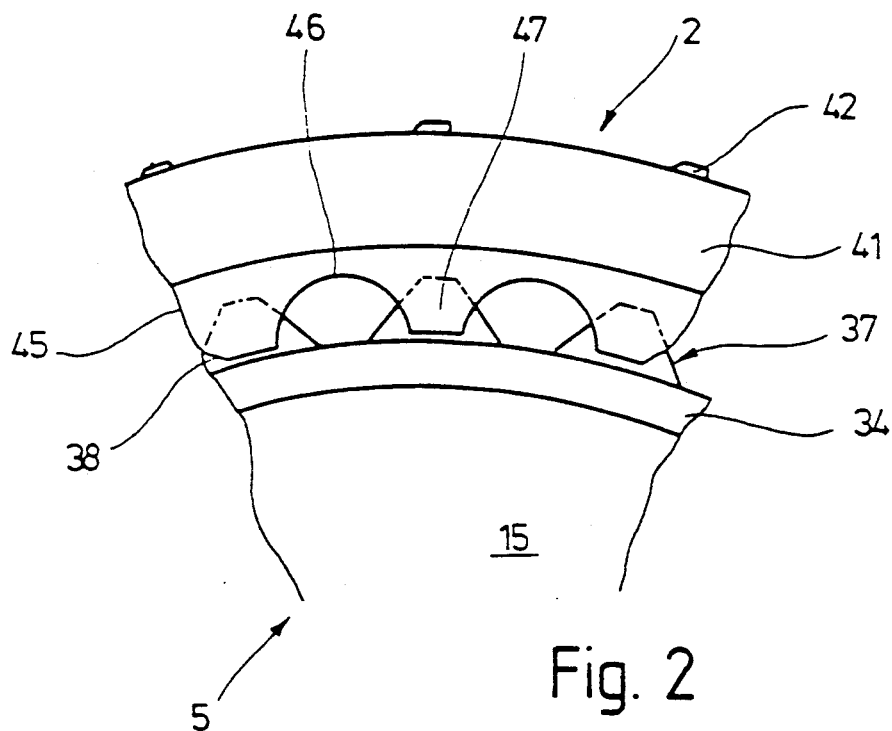
FIG. 2 is a partial section along line II—II in FIG. 1 showing cooperation of the teeth on the tool and on the pressure flange.

The outside circumferential surface of the shoulder 34 has a plurality of equidistantly distributed teeth 37 protruding radially outwardly, as can be seen best in FIG. 2. In the projection onto a plane at right angles to the axis of rotation 12, the teeth 37 have a trapezoidal shape and, as is, in turn, to be seen from FIG. 1, do not protrude in the radial direction beyond the abutment surface 14. All of the teeth 37 are offset from one another by, for example, 15 degrees respectively and define a flat rear side 38 extending parallel and in spaced relation to the abutment surface 14 of the receiving flange 4. The gap between the teeth 37 extends as far as the outside circumferential surface of the shoulder 34. In addition, the teeth 37 are set back with respect to the front side 16 of the pressure flange 5, and in this set back region the pressure flange 5 has a circumferential groove or recess 39.

The face milling cutter 2 consists of a ring-shaped milling cutter main body 41 in which cutter plates 42 are inserted in a known manner. Its inside opening or through-opening 43 which is coaxial with the axis of rotation 12 comprises several substantially cylindrical sections. A first section 44 with the largest diameter leads from the rear side of the face milling cutter 2 into the main body 41. This section is located opposite the cylindrical outside circumferential surface of the receiving flange 4. The inwardly located end of the bore section 44 delimits a ring-shaped, radially inwardly protruding annular web or annular collar 45 which forms a flat surface for abutment on the abutment surface 14 and is divided up by equidistant milled recesses 46 into individual teeth 47. The teeth 47 protrude radially inwardly in the manner of an internal toothing and have the same pitch as the teeth 37 of the pressure flange 5. The size of the milled recesses 46 forming the tooth gap is sufficiently large to allow the trapezoidal teeth 37 to pass through. Towards the front side of the face milling cutter 2 an annular groove 48, the external diameter of which is larger than the top circle diameter of the teeth 37, adjoins the annular web 45. The depth of the groove, measured in the axial direction, is slightly larger than the thickness of the teeth 37, measured in the same direction.

Finally, the annular groove 48 is delimited by a radially inwardly protruding, flat, ring-shaped shoulder 49 which comes to rest in the recess 39 when the face milling cutter 2 is put on.

To enable gripping of the face milling cutter 2 by an automatic tool changer, it comprises on the outside a gripper groove 51 as well as several cylindrical blind bores 52 distributed equidistantly on the same graduated circle.

Figure 3:
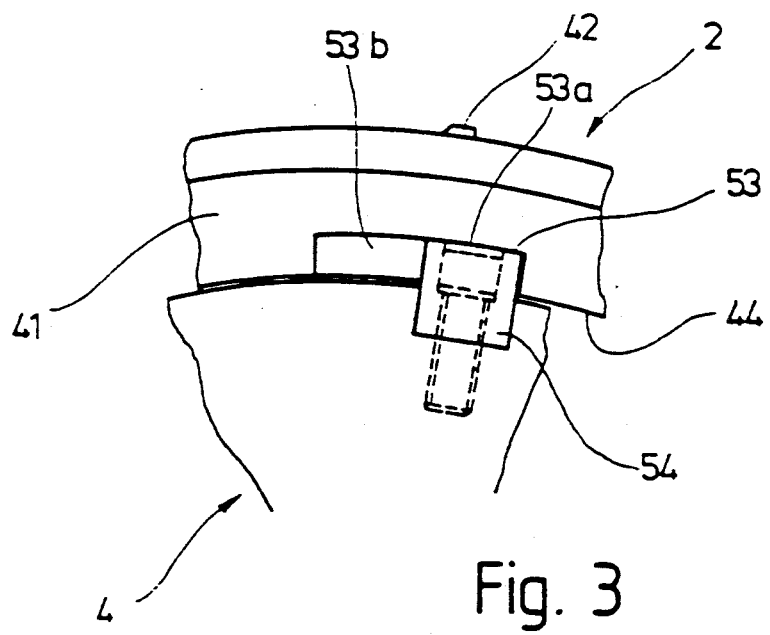
FIG. 3 is a partial rear view from FIG. 1 of cooperation of the engaging member and the associated recess.

Finally, a receiving pocket 53 is provided in the region of the bore section 44 for engagement by an engaging member 54 attached to the outside circumferential surface of the receiving flange 4. As shown in FIG. 3, the receiving pocket 53 is larger in the circumferential direction than the extent of the engaging member 54, measured in this direction, and so the receiving pocket 53 permits limited lost rotational motion of the face milling cutter 2 on the receiving flange 4. The amount of this lost rotational motion corresponds to half of the tooth pitch of the teeth 37, and 47, respectively, (7.5 degrees).

The relative dimensions of the surfaces and structures described above are apparent from the following description of the function.

OPERATION

To position the face milling cutter 2 on the receiving flange 4, the actuating rod 25 extending through the machine spindle 3 is first advanced by an adjusting device 55, more specifically, in such a way that the pressure flange 5 moves to some extent away from the receiving flange 4. The face milling cutter 2 is then pushed, with its bore section 44 ahead, onto the receiving flange 4, more particularly, into a position in which the engaging member 54 can engage the receiving pocket 53. The arrangement is then such that the engaging member 54 dips in on the side of the receiving pocket 53 located opposite the cutting direction. In this position, the teeth 47 are in alignment in the web 45 with the gaps between the teeth 37 and, conversely, the teeth 37 with the milled recesses 46. The face milling cutter 2 can, therefore, be pushed onto the receiving flange 4 until the teeth 37 rest against the shoulder 49. The teeth 47 have then fully passed the teeth 37 and lie between these and the abutment surface 14. Once this abutment position is reached, the face milling cutter 2 is turned in the direction opposite the cutting direction until the engaging member 54 abuts on the other side of the receiving pocket 53. The position shown in FIG. 2 in which the teeth 37 and the teeth 47 are in alignment with one another is thereby reached. By renewed actuation, the actuating rod 25 is pulled towards the spindle nose 7, which pulls the pressure flange 5 together with the face milling cutter 2 in the direction towards the receiving flange 4. The teeth 47 of the face milling cutter 2 are thereby firmly clamped between the teeth 37 of the pressure flange 5 and the abutment surface 14. Simultaneously, the radially inwardly protruding shoulder 49 closes the space in which the teeth 37 and the teeth 47 are located so no chips can penetrate there during operation to cause problems later when the face milling cutter is removed.

The flat abutment surface 14 results in the face milling cutter 2 being held flat over a large area and this holding occurs very far out in the radial direction and is able to transmit large forces. At the same time, the cooperating flat surfaces of the teeth 47 which rest with a snug fit on the abutment surface 14 prevent distortion of the ring-shaped face milling cutter 2 when the pressure flange 5 is pulled close. The clamping of the face milling cutter 2 does not generate any distorting forces in the face milling cutter 2 itself Very fine chips can also be prevented from penetrating by air being blown through the teeth 37 and 47 which are in engagement with one another For this purpose, the actuating rod 25 comprises an air channel 61 receiving pressurized air from a source P. Air channel 61 extends at an angle in the radial direction in the region of the head section 26 and continues in a channel 62 of the journal 18. The channel 62 opens radially in a region of the through-opening 19 which comprises a circumferential annular groove 63 there. From the annular groove 63 there extend radially outwardly in the receiving flange 4 several channels 64 forked at the end which, on the one hand, have outlet openings 65 in the region of the abutment surface 14 where the teeth 47 are located and, on the other hand, outlet openings in the region of the centering surface 10, i.e., on the outside circumferential surface of the receiving flange 4. Therefore, air blown in through the channel 61 will constantly flow between the teeth 37 and 47 and exit towards the front in the region of the centering surface 10. A further improvement is achievable by providing on the rear side of the receiving flange 4 a shoulder 66 which radially outwardly embraces the rearward portion of the ring-shaped main body 41, as shown in FIG. 1, and which also covers the rear side of the milling cutter main body 41. The gap thus formed between the rear side of the milling cutter main body 41 and the shoulder 66 diverts the exiting air towards the front.

In the above description of the function, it was assumed that the receiving pocket 53 has the same axial depth throughout its entire length in the circumferential direction. In use, this results in a positive connection by means of the engaging member 54 in the cutting direction only. If it is to be ensured that a positive connection is also to be established between the receiving pocket 53 and the engaging member 54 in the direction opposite the cutting direction. For example, in order to reliably prevent faulty turning of the face milling cutter 2 on the receiving flange 4 during rapid braking, there is the possibility of dividing the receiving pocket 53 up into two sections 53a and 53b having a different depth, measured in the direction parallel to the axis of rotation 12. The arrangement is then such that section 53a, the width of which in the circumferential direction corresponds to the width of the engaging member 54, has an axial depth which is capable of fully receiving the engaging member 54. The adjoining section 53b in the direction opposite the cutting direction, on the other hand, has a depth, measured parallel to the axis of rotation 12, which is approximately half as large as the depth of the engaging member 54 of rectangular cross-section, measured in the same direction.

To be able to mount the face milling cutter 2 when the receiving pocket 53 is of such design, the pressure flange 5 must execute a stroke which is at least as large as the difference between the axial depths of the two receiving pocket sections 53a and 53b. With a receiving pocket 53 of such design, the face milling cutter 2 can also not turn wrongly during braking if a fault has caused the pressing force, with which the pressure flange 5 is pulled towards the receiving flange 4, to weaken.

I claim:

1. A clamping arrangement (1) for releasably securing a disc-shaped tool (2) having a central opening (43) to the spindle (3) of a machine tool comprising:
a receiving flange (4) fixed coaxially to said machine spindle (3), said receiving flange (4) having a centering surface (10) concentric with the axis of rotation (12) of said spindle (3) as well as a radially extending portion comprising an axial abutment surface (14) for said tool (2), said spindle (3) and said receiving flange (4), having a concentric axially extending through-opening (19), with axially movable pressure member (5) for pressing said tool (2) against said abutment surface of said receiving flange (4), said pressure member (5) having an actuator rod (25) extending within said opening of said spindle (3) and receiving flange (4), and also having a pressure flange (5) fixed thereto which is concentric with said axis of rotation (12) of said spindle (3) said pressure flange (5) having radially protruding circumferentially spaced apart features (37) extending from the periphery thereof, actuator means (55) driving said actuator portion (25) for moving said pressure flange (5) axially to pull said pressure flange (5) towards said abutment surface (14) or move it away from said abutment surface (14); said discshaped tool (2) carrying in said central opening (43) radially inwardly protruding circumferentially spaced apart features (47), the configuration of said respective features corresponding to each other such that in one rotary position of said tool (2) and said pressure flange (5) relative to each other, said features (37) of said tool (2) can pass through the gaps between said features (47) of said pressure flange (5) and in the other relative rotary position, said features (37) of said tool (2) are in alignment with said features (47) of said pressure flange (5) and aligned with said abutment surface (14), whereby axial movement of said pressure flange (5) results in clamping of said tool (2) against said abutment surface (14) of said receiving flange (4).

2. The clamping arrangement as defined in claim characterized in that the number of said features (37) on said pressure flange (5) coincides with the number of said features (47) on said tool (2).

3. The clamping arrangement as defined in claim 2, characterized in that the spacing of said features (37) of said pressure flange (5) from said abutment surface (14) can be reduced by the adjusting device (55) to a dimension which is smaller than the thickness of said features (47) of said tool (2), measured parallel to said axis of rotation (12).

4. The clamping arrangement as defined in claim 1, characterized in that the gaps (46) between said features (47) of said tool (2) have a semicircular shape viewed in the direction of said axis of rotation (12) of said spindle (3).

5. The clamping arrangement as defined in claim 1, characterized in that said features (37) of said pressure flange (5) comprise a series of equidistant teeth (37).

6. The clamping arrangement as defined in claim 1, characterized in that said features (47) on said tool (2) and said features (37) on said pressure flange (5) comprise teeth equidistantly distributed circumferentially about said tool (2) and pressure flange (5) respectively.

7. The clamping arrangement as defined in claim 1, characterized in that said pressure flange (5) carries a coaxial journal (18) which is received in said through-opening (19) of said receiving flange (4).

8. The clamping arrangement as defined in claim 1, further including means (23) positively coupling said tool (2) rotatively to said receiving flange (4).

9. The clamping arrangement according to claim 8 further including locating means (54, 53) for creating a lost motion rotative coupling between said tool (2) and said receiving flange (4) upon moving said tool (2) axially onto said pressure flange (5), said means (54, 53) establishing two rotative positions corresponding to a first position with said features offset to allow removal of said tool (2) and a second position with said features aligned.

10. The clamping arrangement as defined in claim 9, wherein said locating means includes an engaging member (54) fixed on one of said receiving flange (4) or on said tool (2), and a recess (53) formed in the other of said tool (2) or said receiving flange (4), said recess (53) in a section viewed in the axial direction has a width, measured in the circumferential direction, which is larger than the dimension of said engaging member (54) in this direction such that said tool (2) is rotatable to a limited extent relative to said receiving flange (4) through angle which corresponds to half of the angular offset between adjacent features (37, 47) on said pressure flange (5) and said tool (2), respectively.

11. The clamping arrangement as defined in claim 10, characterized in that said recess (53) has in a section (53a) corresponding to the extent of said engaging member (54 measured in the circumferential direction a depth measured parallel to said axis of rotation (12) which does not obstruct abutment of said features (47) of said tool (2) on said abutment surface (14), while the depth in the other section (53b) prevents abutment of said features (47) on said abutment surface (14).

12. The clamping arrangement as defined in claim 1, characterized in that said pressure flange (5) carries a shoulder (34) which extends in the direction towards said receiving flange (4) and surrounds a concentric centering collar (13) of said receiving flange (4), and in that the gap between said centering collar (13) and said shoulder (34) is sealed.

13. The clamping arrangement as defined in claim 1, characterized in that said pressure flange (5) and receiving flange (4) have conical surfaces (15, 17) mating when said pressure flange (5) is moved to clamp said features (37, 47) thickness, measured in the direction parallel to said axis of rotation (12), in the direction towards said axis of rotation (12).

14. The clamping arrangement as defined in claim 1, characterized in that said tool (2) has in said central opening (43) a radially inwardly protruding shoulder (49) which covers at least said features (37) of said pressure flange (5) with said tool (2) installed thereon.

15. The clamping arrangement as defined in claim 1, characterized in that said receiving flange (4) has air channels (64, 65) opening in the region of said abutment surface (14) and of said centering surface (10) adjacent said features (37, 47) and an air pressure source (61, 62) (P) for directing pressurized air into said channels (64, 65) to clear chips.

16. The clamping arrangement as defined in claim 1, characterized in that said receiving flange (4) has a shoulder (66) which covers the rear side of said tool (2) and partly embraces the outside circumference of said tool (2).

* * * * *